UNITED STATES PATENT OFFICE.

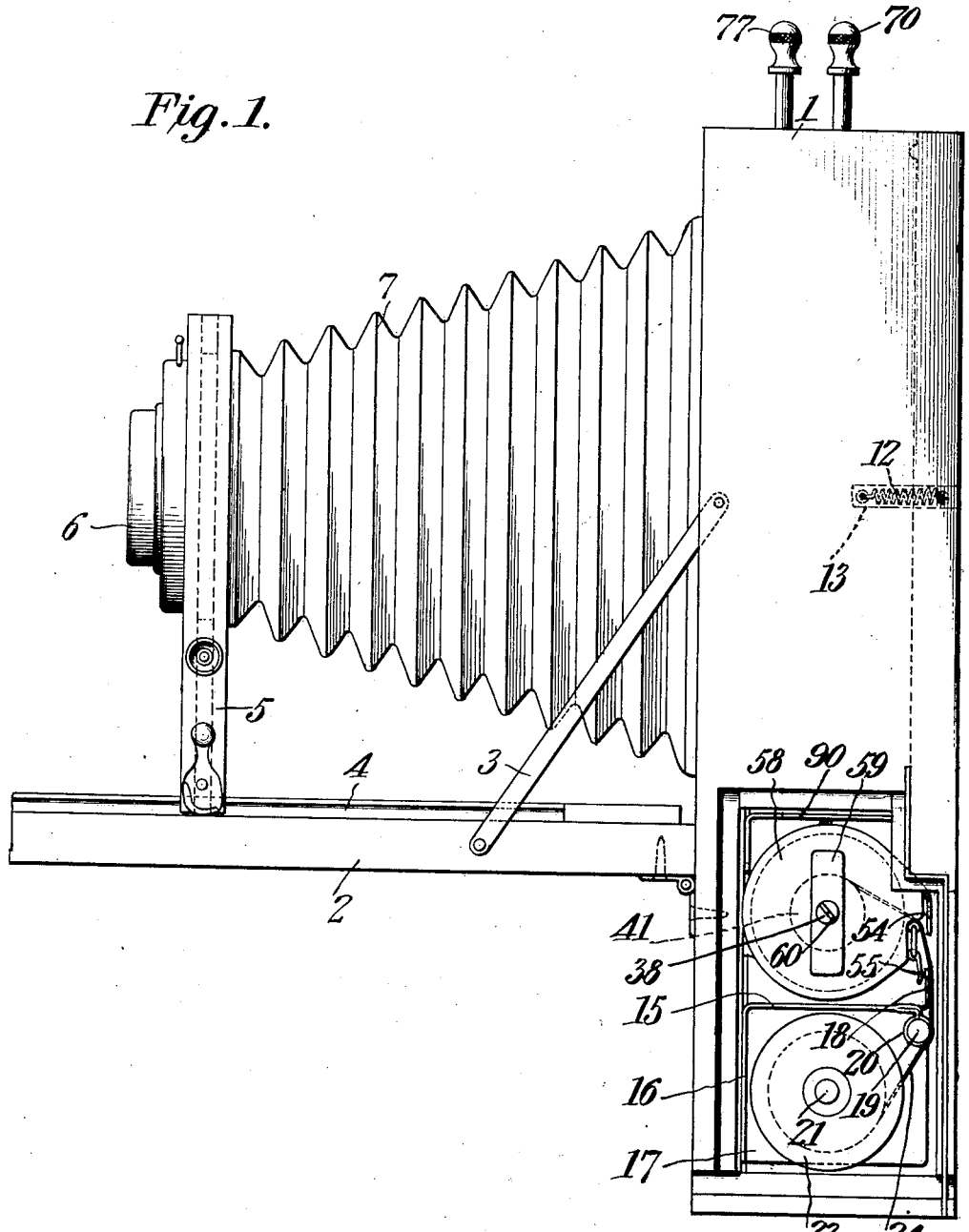

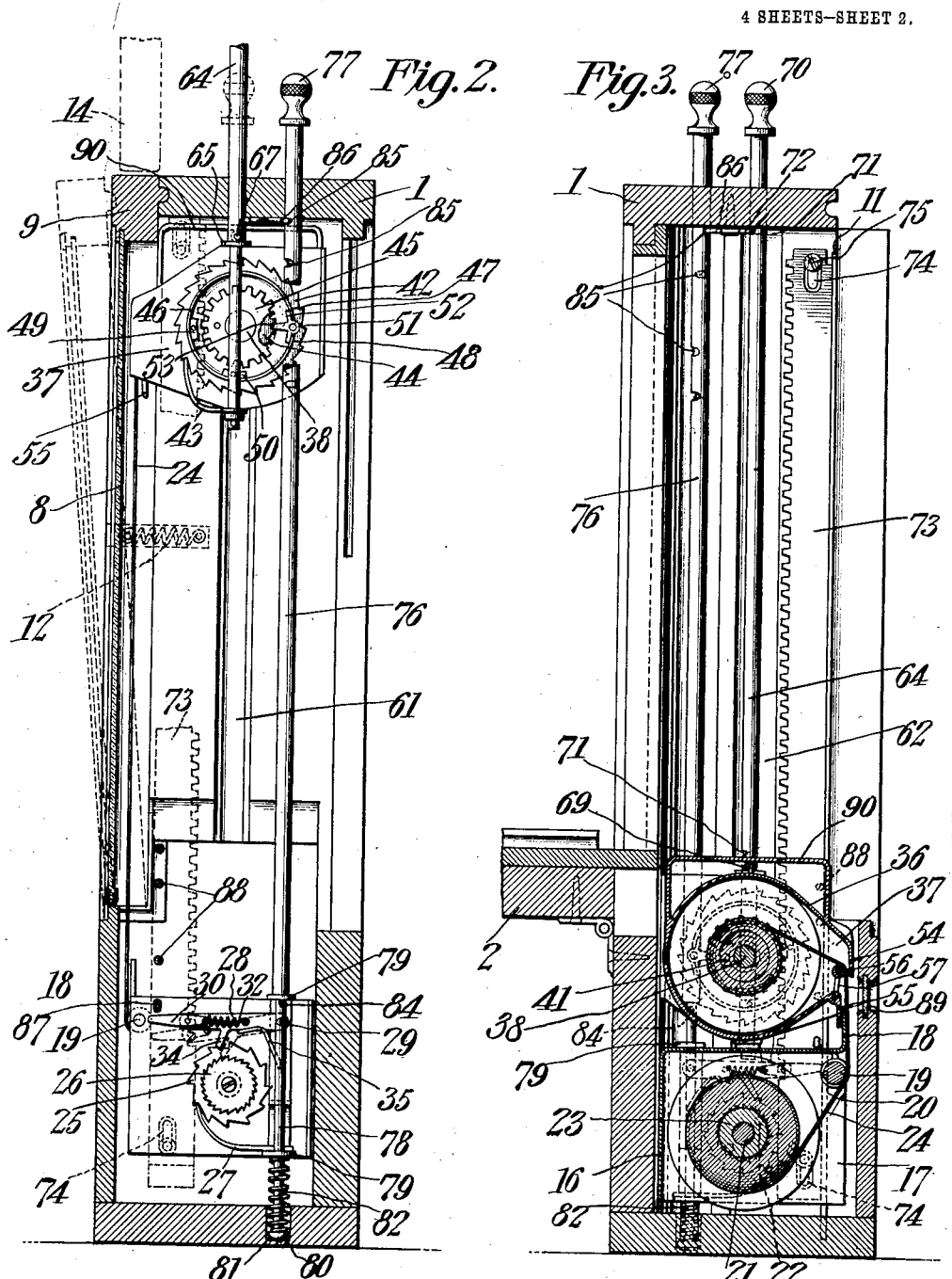

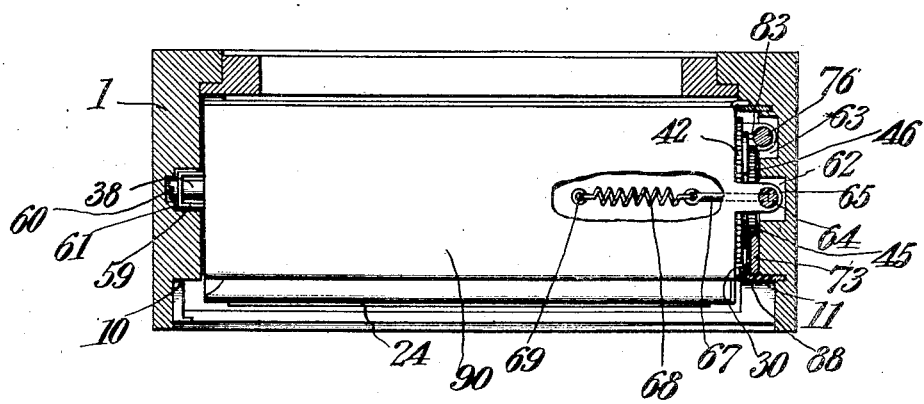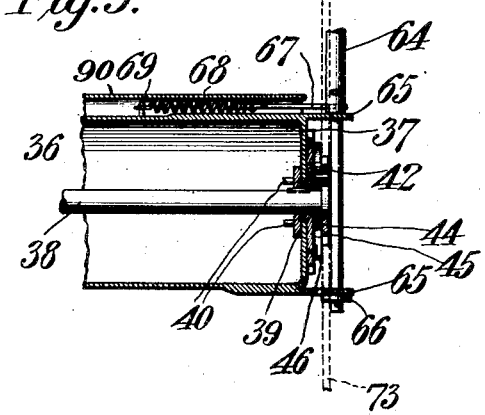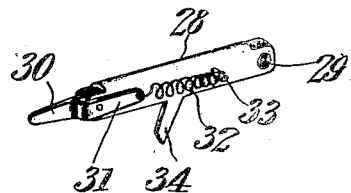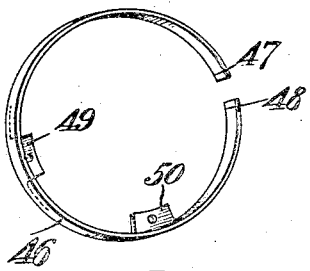

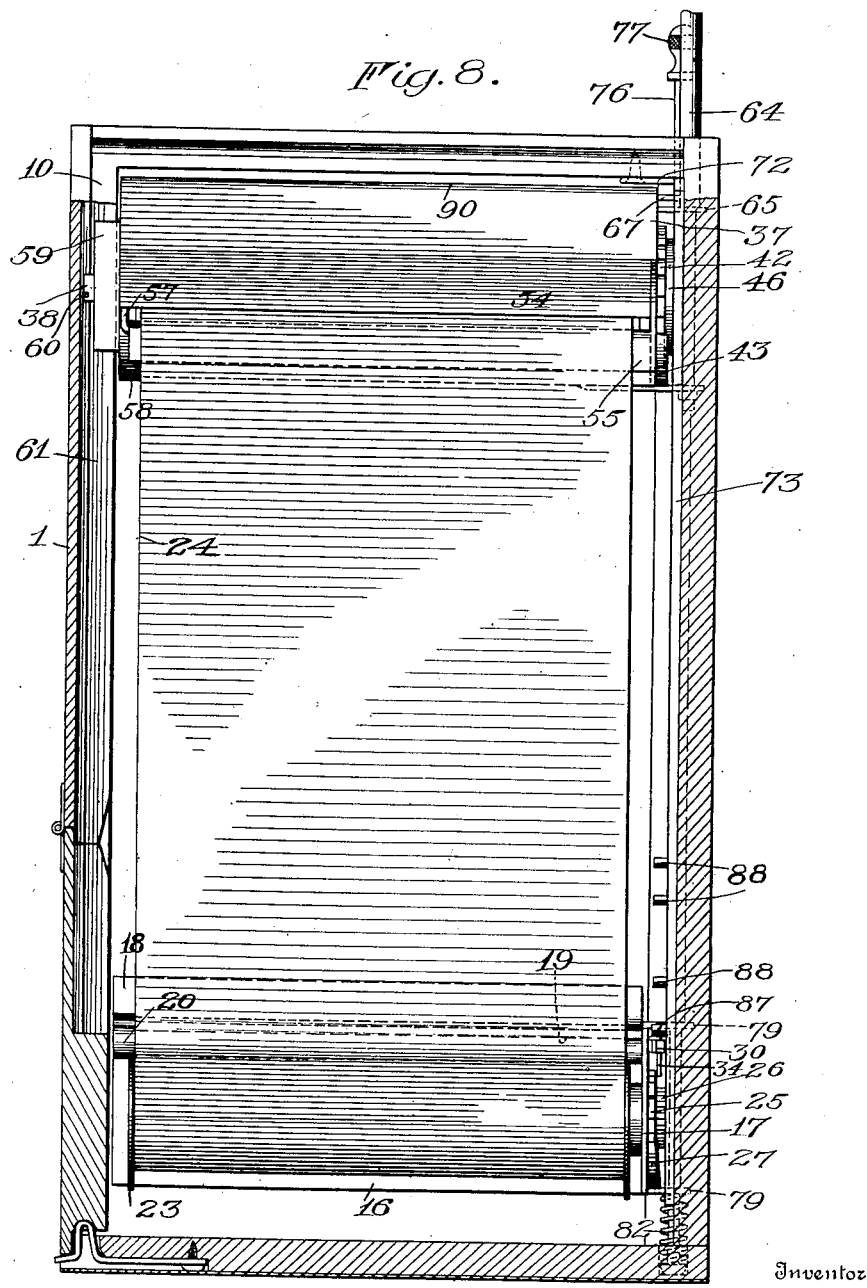

WILLIAM A. PETERS, OF JOHNSTOWN, PENNSYLVANIA.

ROLL-HOLDER FOR PHOTOGRAPHIC CAMERAS.

1,031,023.

Specification of Letters Patent.

Patented July 2, 1912.

Application filed March 12, 1907. Serial No. 361,969.

*To all whom it may concern:*

Be it known that I, WILLIAM A. PETERS, a citizen of the United States, residing at Johnstown, in the county of Cambria and State of Pennsylvania, have invented a new and useful Roll-Holder for Photographic Cameras, of which the following is a specification.

This invention relates to photography and has reference to improvements in roll holders for photographic cameras, and its object is to provide a means whereby the movements necessary to bring the sensitive film into position to be exposed to the image produced by the camera lens shall be reduced to a minimum, and whereby the movements necessary to wind the exposed portions of the film upon the receiving spool are likewise reduced to a minimum.

The invention likewise has as an object the provision of means whereby a less area of film than that representing the maximum capacity of the camera may be exposed without any waste of the film, so that the full number of exposures for which the film is arranged may be made *seriatim* or a larger number of exposures of smaller size, or of the larger and smaller sizes interspersed as desired, may be made on the same length of film without any waste of the film.

The invention comprehends the use of two spool holders such as are usually provided for cameras using roll films, one of the spool holders receiving the original spool carrying the unexposed roll of film and the other spool holder receiving the empty spool upon which the film is wound as exposed.

The spool holder carrying the empty spool with the forward edge of the unexposed film or black paper protector therefor is movable across the focal plane of the lens in such manner as to draw the unexposed film from off the full spool and hold it in a stretched or taut condition in the focal plane of the camera lens, so that the exposure may be made in the usual manner. Then as the receiving spool is again moved to its initial position it is caused to rotate and automatically wind up the exposed portion of the film on itself, while the spool carrying the unexposed film is held against rotation.

The invention comprises a number of other features which will appear from the following detailed description and which are illustrated in the accompanying drawings forming a part of this specification, wherein,—

Figure 1 is a side elevation of a roll holder constructed in accordance with and illustrating one embodiment of my invention, with certain parts removed, forming a part of a camera; Fig. 2 is a vertical section near the end of the roll holder opposite to that shown in Fig. 1 but with the camera body omitted; Fig. 3 is a vertical section taken about centrally through the roll holder; Fig. 4 is a cross section through the body of the roll holder, taken at a point above the spool carriers and looking down thereon, certain parts being broken away; Fig. 5 is a vertical section through one end of the upper spool carrier; Figs. 6 and 7 are perspective views of details of the construction and Fig. 8 is a rear elevation of the roll holder mechanism showing a portion of the film stretched between the carriers in the focal plane of the camera ready for exposure, the view being taken in section substantially in the plane of the inner face of the rear wall of the casing.

Referring to the drawings, there is shown a rectangular case 1 which may be generally designated as the roll holder case. In the structure shown in Fig. 1 this case also constitutes a camera body and is provided with a hinged falling front 2 arranged to be supported in a position perpendicular to the plane of the front face of the roll holder by links 3 in a manner commonly provided in folding cameras. This falling front 2 has the usual track 4 upon which may be carried the usual front board 5 of an ordinary folding camera. The front board is provided with a lens 6, of which the mounting only is shown in the drawings, and between the front board 5 and the body 1 of the roll holder is the usual extensible and collapsible light-excluding bellows 7.

The casing extends below the junction of the front board 2 therewith for a distance sufficient to contain certain mechanism to be hereinafter described, and at the rear of the casing is located the usual focusing ground-glass screen 8 mounted as usual in a rectangular frame 9 which may be seated between the sides of the casing and against shoulders 10—11 formed therein, the shoulder 11 being, if desired, formed by a metal plate, the function of which will hereinafter appear. The focusing screen 8 with its frame is held to its seat in the back of the roll holder frame by springs 12 contained in pockets 13 in the side walls of the casing, as indicated in dotted lines in Figs. 1 and 2, so that the frame 9 will yield on the introduction of an ordinary camera plate holder, indicated by dotted lines at 14 in Fig. 2. Thus this roll holder is adapted for the use of plates as well as films.

Normally located in the portion of the roll holder casing which projects below the drop-front 2 are two frames for the support of the film-carrying spools. The lower frame consists in the present instance of a top plate 15 and a side plate 16 at right angles thereto and preferably formed in one piece therewith and this frame also has one end plate or wall 17, the other end being uncovered. The edge of the wall 15 toward the rear of the casing 1 is formed into an upturned flange 18 and just below this flange and separated from the lower face of the top plate 15 is a longitudinally-extending rod 19 fast at one end in the wall 17 and at the other end in a bracket 20 depending from the corresponding end of the top plate 15. Journaled in the end wall 17 and extending longitudinally through the casing formed by the walls 15 and 16 is a shaft 21 such as is usually provided for the reception of a spool carrying a roll of sensitive photographic film, and this shaft is provided just inside the wall 17 with the usual head from which project pins 22, indicated by dotted lines in Fig. 3. These pins 22 are provided to engage the spool 23 carrying the roll of sensitive film to be exposed. In the drawings this film is indicated at 24.

The shaft 21 has journal bearings in the wall 17 and projects to the other side thereof where it carries a ratchet disk 25 (Fig. 2) having teeth arranged to prevent the rotation of the shaft in a direction which would permit the winding up of the sensitive film on the spool carried by said shaft, and this shaft also carries another ratchet wheel 26 having teeth arranged to prevent the rotation of the shaft and the spool carried thereby in the other direction. Fast upon the end plate 17 in position to engage the teeth of the disk 25 is a spring pawl 27, and also upon this same plate 17 is pivoted another pawl 28, the construction of which is best shown in Fig. 6. This pawl consists of an arm pivoted at one end 29 to the plate 17 and at the other end carrying a pivoted dog 30 having an arm 31 extending to the other side of its pivot and there held by a spring 32 fast at 33 to the body of the pawl 28. This dog 30 is movable about its pivot on the body of the pawl 28 by any force sufficiently great to overcome the tension of the spring 32. The pawl 28 also carries a tooth 34 arranged to engage with the teeth of the ratchet disk 26 under conditions which will hereinafter appear. The pawl 28 is maintained in a normally elevated position by means of a bent spring 35 having one end fixed to the plate 17.

Now, it will be seen that when the pawl 28 is held in the elevated position with the tooth 34 out of engagement with the teeth of the ratchet disk 26 the shaft 21 and the spool 23 carried thereby are free to be rotated in one direction, which will be that permitting the film 24 to be unrolled from the spool 23. If, however, the pawl 28 be depressed against the action of the spring 35 until the tooth 34 engages the teeth of the ratchet disk 26, the shaft 21 and the spool 23 thereon will then be locked against rotation in either direction.

The carrier for the receiving spool for the film consists of a substantially cylindrical housing 36 having one end open and the other closed by a plate 37. This housing carries axially through it a shaft 38 provided with a head 39 (Fig. 5) adjacent to the end plate 37, and this head 39 is provided with pins 40 for engagement with one end of the receiving spool, indicated at 41. The shaft 38 is journaled in the end plate 37 by means of the hub of a ratchet disk 42 arranged on the outside of the plate 37 and engaged by a spring pawl 43. Exterior to the ratchet disk 42 and loose upon the shaft 38 is a ratchet pinion 44, and fast upon this pinion 44 is a gear pinion 45, the function of which will be hereinafter referred to. The ratchet disk 42 carries near its periphery a spring member 46 of substantially circular contour and separately shown in Fig. 7. This spring member is discontinuous; that is, it has two contiguous but separated ends 47 and 48. Diametrically opposite these ends the spring is formed with a stud 49 by which it is secured to the ratchet disk 42, and at a point about midway between the stud 49 and the end 48 of the spring is another stud 50 by which the spring is also secured to the ratchet disk 42.

Fast upon the ratchet disk 42 at a point midway between the ends 47 and 48 of the spring is pivoted a dog 51 having oppositely-extending wings 52 and a tooth 53 projecting into the path of the teeth of the ratchet pinion 44. The spring ends 47 and 48 engage the wings 52 and normally hold the dog 51 with its tooth 53 in engagement between two teeth of the ratchet pinion 44. It will be seen that a force tending to move the pinion 44 in one direction will be opposed by the spring end 47, and a force tending to rotate the ratchet pinion 44 in the other direction will be opposed by the spring end 48. Now, the two spring members are of the same thickness but of different lengths since one extends from the stud 49 to the end 47 and the other from the stud 50 to the end 48. Consequently, the spring member terminating in the end 48 is much stiffer or stronger than the spring member terminating in the end 47, and a materially greater force must be applied to the pinion 44 to overcome the spring member terminating in the end 48 than would be necessary to overcome the force of the spring member terminating in the end 47. The purpose of all this will hereinafter appear.

Returning now to the housing 36, it will be observed that it has a side extension through which there is a longitudinal slot from the plate 37 to the other end of the housing, and one edge of this slot is provided with a downwardly-extending lip 54 and the other edge of the slot is provided with a downwardly-extending lip 55. Interior to the mouth formed between the downwardly-extending lip 54 and the other edge of the slot is a roller 56 having its journal supported by a bracket 57 fast in the wall of the housing along the slot formed in the side extension thereof. This roller 56 serves as a guide for the film 24 coming from the lower spool over the rod 19, thence past the flange 18 into the housing 36 through the longitudinal slot therein and over the roller 56 and finally on to the receiving spool 41. The front or open end of the housing 36 is normally closed by a cap 58 (Figs. 1 and 4) having a diametric tongue or flange 59 formed thereon and through which the shaft 38 extends, being there formed with a slot 60 for the application of a winding key by which the protecting paper, which extends beyond the end of the film, is wound upon the receiving spool to protect the film when removed from the housing 36.

The flange 59 is adapted to engage in and move along a longitudinal slot 61 formed in the interior wall of the corresponding side of the casing 1, and the interior wall of the other side of the casing 1 is provided with two longitudinal slots 62 and 63. Within the slot 62 is disposed a rod 64 fast at its lower end in two ears 65 (Fig. 5) formed on or secured to the opposite sides of the housing 36 so that the rod 64, which is reduced at the end passing through the ears 65, may have a rotative movement in these ears 65 but is prevented from longitudinal movement therein by a shoulder formed above the upper ear 65 and by a collar 66 below the lower ear 65. Above the upper ear 65 the rod 64 carries a finger 67, the outer end of which is fast to one end of a spring 68 secured at its other end by a pin 69 to the housing 36. The upper end of the rod 64 extends through the top of the casing and is there provided with a manipulating knob 70, and at a point just above the finger 67 and at another point just below the top of the casing 1, when the rod is in the position shown in Fig. 3, this rod is provided with a notch 71. Fast on the under side of the top wall of the casing 1 there is a spring catch 72 arranged to engage one or the other of the notches 71.

On the inner face of the casing adjacent to the longitudinal groove 62 there is secured a rack bar 73 extending approximately the entire length of the interior of the casing from the top to the bottom. Near each end this rack bar is slotted, as indicated at 74 (Fig. 3), and screws or other fastening means 75 serve to hold this rack bar against the side of the casing but permit a longitudinal movement thereof determined by the length of the slots 74. The teeth of the rack bar are in engagement with the gear pinion 45 carried upon the shaft 38, upon which latter is placed the receiving spool 41.

Now, when the knob 70 of the rod 64 is grasped and the latter is given a slight rotative movement against the action of the spring 68, the notch 71 is carried away from the spring catch 72 and the rod is then free to be pulled longitudinally upward out of the casing 1. Such manipulation of the rod will cause the housing 36, and the parts therein, to be lifted from its normal position, which is in the lower portion of the casing above the support or housing for the film spool 23, upward toward the top of the casing until the latter point is reached, when the lower notch 71 will be engaged by the spring catch 72 and the spool carrier will then be locked in this position, the rod 64 in the meantime having been released to the action of the spring 68 and the notch 71 being thereby brought into the path of the said spring catch 72.

When the receiving spool carrier is elevated the gear pinion 45 is rotated upon the shaft 38, but since the pawl 43 engaging the ratchet disk 42 prevents rotation of the latter and therefore of the shaft 38, the receiving spool 41 is not permitted to rotate, and, consequently, the ratchet pinion 44 being fast to the pinion 45 must rotate relative to the ratchet disk 42. This is permitted because the rotation of the ratchet pinion 44 is opposed only by the dog 51 which is held by the action of the weaker member of the spring 46. However, the lower spool, carrying the unexposed film, is free to be rotated by the pull exerted by the upper spool through the film 24, which latter, it will be understood, has been attached to the upper spool in the usual manner when the spool carrier was first loaded. The frictional contact of the spools has been sufficient during this manipulation to hold a film sufficiently stretched or taut to cause it to present a plane surface in the focal plane of the lens.

Seated in the longitudinal groove 63 is another rod 76 having its upper end extending through the top of the casing and there provided with a knob 77. The lower end of this rod is reduced, as indicated at 78, (Fig. 2) and extends through ears 79 formed on the outer face of the end plate 17 of the casing supporting the charged roll. The reduced end 78 of the rod extends below the lower ear 79 and its extreme lower end is formed with a head 80 normally located in a seat 81 formed on the bottom wall of the casing. Between the head 80 and the lower ear 79 the reduced end 78 of the rod is surrounded by a helical spring 82. The upper ear 79 is formed with a slot 83 (Fig. 4) leading off from the passage through which the rod 76 extends, and this rod 76 is provided with a pin 84 projecting from one side thereof and so located that it may pass through the slot 83 when coincident therewith but is below the ear 79 when the larger portion of the rod 76 is seated thereon. This rod 76 may be rotated axially and this axial rotation will bring the pin 84 under the ear 79 and thus lock the rod to the lower spool carrier.

The rod 76 is provided with a series of notches 85 one of which, when the rod is in its lowermost position, is engaged by a catch 86 similar to the catch 72 and located adjacent thereto. The next notch 85 is located below the upper notch 85 and is displaced circumferentially with relation thereto, and the next two notches 85 are appropriately located below the other notches and are, in turn, circumferentially placed with relation thereto.

It has already been stated that the rack 73 has a certain amount of longitudinal movement within the casing. Now, when the upper spool carrier is lifted toward the top of the casing it first carries the rack bar upward as far as permitted by the length of the slots 74 or by the engagement of the upper end of the rack bar with the under face of the top of the casing. Upon the rack bar are a number of pins 87—88. The pin 87 is lowermost and may, if desired, be of heavier construction than the other pins. All these pins are in the path of the dog 30 of the pawl 28 and when the rack bar is in its lowermost position the pin 87 engages the dog 30 and depresses the pawl 28 around its pivot 29 until the tooth 34 engages one of the teeth of the ratchet disk 26, thus holding the charged spool of unexposed film against rotation in either direction. Now, when the upper spool carrier is lifted this pawl 28 is released from contact with the pin 87 and its spring 35 elevates it until the tooth 34 is free from the ratchet disk 26 and the charged spool may then be rotated in a direction to draw the film from it. Now, when the upper spool carrier is in its lowermost position it bears upon and depresses the lower spool carrier against the action of the spring 82, in which case the pin 84 is passed through the slot 83 and stands some distance above the upper ear 79. When the upper spool carrier has been lifted as before described the lower spool carrier follows it for a distance, being elevated by the spring 82 and then finally stopped by the shoulder formed between the reduced portion 78 and the main portion of the rod 76, the pin 84 having then again passed through the slot 83 and resting below the ear 79.

Having elevated the upper spool carrier as before described and having exposed the stretched film to the action of the light coming through the lens, the rod 64 is again depressed, being first slightly turned to release it from the catch 72. The first result of this movement is to depress the rack 73 until stopped by the screws or fastening devices 75, when the pin 87 will have engaged the dog 30 and the tooth 34 is brought into contact with one of the teeth of the ratchet disk 26 thus locking the charged film spool against rotation. The gear pinion 45 now rotates because of its movement along the rack bar 73 and through the ratchet pinion 44 and dog 51 this gear pinion 45 is locked to the ratchet disk 42 by the stronger member of the spring 46, and as rotation of the film-receiving spool is not opposed by the pawl 43 and ratchet disk 42, this spool is rotated in a direction to wind thereon the section of the film that has been exposed. But since the film is winding on a surface of constantly increasing radius, it is being wound on the spool at a faster rate than the spool is being moved downward. This quickly takes up the slack in the film produced by the slight downward movement of the rack and ultimately the film is put under such tension as to overcome the stress of the shorter end of the spring 46 and the dog 51 will slip over one or more teeth of the ratchet pinion 44, thus preventing too great a strain from being brought to bear upon the film.

When the upper spool carrier was first lifted the lower spool carrier was elevated as before described. The purpose of this initial elevation of the lower spool carrier is to bring the flange 18 with its upper edge coincident with the lower margin of the light image so that it acts as a light shield and the film is not affected by the light image below this point, and, consequently, the film is not wasted. The upper limit of the exposed portion of the film is determined by the lip 55 before referred to, formed on the housing 36 and similarly acting as a light shield.

The parts are so proportioned and the movements so regulated that the exposed portion of the film will not be greater than the amount drawn from the charged roll at each upward movement of the upper spool carrier. It will be noticed that the lip 55 and flange 18 overlap when the spool carriers are adjacent. This permits a more compact arrangement of the spool carriers when adjacent.

It is sometimes desirable to expose a less length of film than would be necessary to include the full field of the lens or the maximum size of picture for which the camera is designed. For this purpose the rod 76 is provided and by giving it a slight axial turn, sufficient to unlock it from the catch 86 and which at the same time will carry the pin 84 under the ear 79, this rod may be lifted and with it the lower spool carrier until the second, third or fourth notch 85 is engaged by the catch 86, and the notch 85 to be engaged by the catch 86 is determined by the extent of axial movement given to the rod 76. This upward movement of the spool carrier is opposed by the dog 30 on the pawl 28 engaging the first pin 87 on the rack 73, but the dog 30 gives to a force superior to that of the spring 32 and will ride under the pin 87 and be moved into the path of one or the other of the pins 88, according to the height to which the spool carrier has been elevated. It will thus be seen that when the lower spool carrier is in one of the desired elevated positions, the upper spool carrier will have been carried with it a more elevated starting point for its individual travel and will have less range of vertical movement and only so much of the film will be exposed each time as will correspond to the position of the lower spool carrier with relation to the upper spool carrier, and thus the user is enabled to make a number of short-length pictures interspersed with the regular length pictures, or may make a greater number of short-length pictures than full-length pictures, all without wasting any of the film.

It will now be seen that the plate 11 before referred to is introduced to form an abutment or shoulder for the ground-glass frame and at the same time prevents any engagement therewith of the rack 73. It will also be seen that there is a short length of film between the two spool carriers when the latter are in close relation and the casing 1 may be perforated opposite this point and this perforation may be closed by a small piece of appropriate non-actinic glass 89, or other transparent medium, whereby a peep opening is provided so that the user may ascertain how many portions of the film have been used and how much remains.

Since the housing 36 is practically cylindrical and it is desirable that its upper edge should be flat and in line with the surface of the drop-front 2 in order that the bellows and front board of the camera may be contained therein, this housing 36 is provided with a flat supplemental cover 90 which may be made in one piece with or suitably connected to the cylindrical portion of the housing 36, and within this portion 90 the spring 68 and finger 67 may be contained.

The roll holder forming the subject of the present invention has been illustrated in connection with a folding camera which may be considered as of the pocket type, but it is to be understood that the bellows and lens form no necessary part of the roll holder and that the said roll holder may be so made as to be used with any type of hand camera desired.

I claim :—

1. In a roll holder for photographic cameras, a carrier for a charged spool of sensitive film, another carrier for a receiving spool for the exposed film, means for moving the second carrier away from the carrier for the charged spool, and means for moving the carrier for the charged spool for a limited distance toward the carrier for the receiving spool during the initial period of its movement away from the charged spool carrier.

2. In a roll holder for photographic cameras, a carrier for a charged spool of photographic film, another carrier for a spool for receiving the exposed photographic film, means for moving the receiving spool carrier away from the charged spool carrier to draw the film from the latter, means for moving the charged spool carrier with the receiving spool carrier for a limited distance during the initial movement of the latter, means for moving the receiving spool carrier toward the charged spool carrier, and means for causing the rotation of the receiving spool during the movement of its carrier toward the charged spool carrier.

3. In a roll holder for photographic cameras, a carrier for a charged spool of photographic sensitive film, a rotatable shaft or spindle therein for the charged spool of film, a pawl-and-ratchet detent in normal engagement for preventing the rotation of the shaft except in one direction, another ratchet carried by the shaft, a pawl normally out of engagement therewith but co-acting with the ratchet to prevent movement thereof when in engagement, another spool carrier having a pawl and ratchet detent for preventing rotation of the spool except in one direction, a gear pinion thereon, means connecting the gear pinion to the spool support for causing the rotation of the latter, and a rack engaged by the pinion and having a limited range of longitudinal movement said rack being provided with a stop positioned to engage and move the normally inactive pawl into engagement with the locking ratchet on the charged spool shaft.

4. In a roll holder for photographic cameras, a carrier for a charged spool of photographic film, another carrier for the receiving spool for the exposed film, means for moving the carrier for the receiving spool away from and toward the carrier for the charged spool, a rack, a gear pinion on the carrier for the receiving spool meshing with the said rack, a ratchet pinion fast on said gear pinion, a pawl engaging said ratchet pinion and yielding in both directions but to unequal forces, and a pawl-and-ratchet detent for the receiving spool carrier permitting its rotative movement in but one direction.

5. In a roll carrier for photographic cameras, a receiving spool support comprising a suitable casing or housing, a shaft therein, a pawl-and-ratchet detent fast on the shaft, a gear pinion and a ratchet pinion connected together and loose on the shaft, a pivoted pawl or dog engaging the ratchet pinion and movable in either direction about its pivot, springs of unequal strength engaging said pawl or dog, and a relatively fixed rack bar engaging said gear pinion.

6. In a roll holder for photographic cameras, a carrier for a charged spool of photographic sensitive film comprising a suitable case or housing, a shaft in said case or housing for the reception of the charged spool, a pawl-and-ratchet detent for said shaft permitting it to move in one direction only, another pawl-and-ratchet detent on the spool carrying shaft normally out of engagement, and means for moving this last-named pawl into engagement with its ratchet.

7. In a roll holder for photographic cameras, a relatively fixed carrier for a charged spool of sensitive photographic film, another carrier for a receiving spool for the exposed film and movable away from and toward the carrier for the charged spool, means for moving the carrier for the receiving spool comprising a rod connected to said carrier and arranged to be rotated on its longitudinal axis and also moved longitudinally, and a lock for holding the rod at the extreme limit of its travel in each direction.

8. In a roll holder for photographic cameras, a suitable casing, a support for a charged spool of photographic film within said casing, another support for a receiving spool for the exposed film and movable within the casing away from and toward the support for the charged spool through the full range of travel provided, and means for moving the support for the charged spool to any one of a number of predetermined positions toward the support for the receiving spool and there locking it.

9. In a roll holder for photographic cameras, a carrier for a charged spool of sensitive photographic film, a rotatable shaft on said carrier for receiving the charged spool, a pawl-and-ratchet detent for the shaft locking it against movement except in one direction, a normally disengaged pawl-and-ratchet detent for locking the shaft against movement in the other direction, another carrier for a spool for receiving the exposed film and movable away from and toward the first-mentioned carrier, a shaft on the receiving spool carrier for the said spool, a pawl-and-ratchet detent for holding said spool against rotative movement except in one direction, a pawl carried by the rotative element of the detent and under the control of springs of different strength, a ratchet pinion loose on the shaft and under the control of said pawl, a gear pinion fast to said ratchet pinion, a rack bar meshing with said gear pinion and having a limited longitudinal movement relative thereto, and means on the rack bar for engaging the normally inactive pawl on the carrier for the charged spool.

10. In a roll holder for photographic cameras, a suitable casing, a carrier for a charged spool of photographic film mounted in said casing, another carrier for a spool to receive the film after exposure, also mounted in said casing, means for moving the last-named carrier within the casing away from and toward the first-named carrier to the full extent of travel provided, means for moving the carrier for the charged spool toward the carrier for the receiving spool, and a light-excluding means on the carrier for the charged spool adjacent to the film after leaving the charged spool and movable with said carrier for the charged spool into the field of light coming from the camera lens.

11. A roll holder for photographic cameras comprising a suitable casing coextensive with the largest sized image to be impressed upon the photographic film and having an extension or pocket to one side of said image area, a carrier or support for a charged spool of photographic film located in said pocket, another carrier for a receiving spool for the exposed film movable across the field of the camera and locked against rotative movement to draw the sensitive film from the charged spool, and means for returning the receiving spool carrier to its initial position and simultaneously rotating it to take up the exposed film.

12. In a roll holder for photographic cameras, means for supporting a charged spool, a film-receiving spool movable away from and toward the charged spool to draw the film therefrom for exposure, means for actuating the film-receiving spool to wind the exposed film on the film-receiving spool during its movement toward the other, and a yielding element in said actuating means permitting the receiving spool to rest when the film is completely wound up for compensating the receiving spool for the increased diameter of the roll of film taken thereon.

13. In a roll holder for photographic cameras, the combination with a casing of a feeding carrier for a charged roll of film, a receiving carrier for the exposed roll, means for moving the receiving carrier relatively to the casing and away from the feed carrier, means for holding the receiving roll against rotation during such movement and coöperating elements on the receiving carrier and casing respectively for rotating the receiving roll by a reverse movement of the carrier toward the feed roll carrier.

14. In a roll holder for photographic cameras, a feeding carrier for a charged roll of film, a receiving carrier for the exposed roll, means for moving the receiving carrier away from the feed carrier, means for holding the receiving roll against rotation during such movement and means for automatically rotating the receiving roll by a reverse movement of the carrier toward the feed roll carrier and simultaneously locking the latter.

15. The combination with a camera, of a feeding carrier for a charged roll of film movable to different positions in the focal plane of the camera and a receiving carrier for an exposed roll of film movable relatively to and independently of the carrier for the charged roll.

16. The combination with a camera, of a feeding carrier for a charged roll of film and a receiving carrier for an exposed roll of film, one of said carriers being movable relatively to the other and both being movable together in the same direction in the focal plane of the camera.

17. The combination with a camera, of a feeding carrier for a charged roll of film and a receiving carrier for an exposed roll of film, means for moving the feeding carrier to different positions in the focal plane of the camera and means for moving the receiving carrier relatively to and independently of the feeding carrier.

18. The combination with a camera, of a feeding carrier for a charged roll of film and a receiving carrier for an exposed roll of film, means for moving one of said carriers relatively to the other and means for moving both together in the same direction in the focal plane of the camera.

19. In a roll holder, the combination with a feeding carrier for a charged roll of film and a receiving carrier for an exposed roll of film, of means for moving both carriers together in the same direction, means for halting the feeding carrier at a predetermined point and means for continuing the movement of the receiving carrier relatively to the feeding carrier.

20. In a roll holder, the combination with a feeding carrier for a charged roll of film and a receiving carrier for an exposed roll of film, of means for moving both carriers together in the same direction and means for advancing the receiving carrier beyond the other at a predetermined point in their joint movement.

21. In a roll holder for photographic cameras, the combination with two relatively movable carriers for a feeding roll of charged film and a receiving roll of exposed film, respectively, of means for locking the feeding roll as the carriers are moved together, means for locking the receiving roll against rotation as the carriers are moved apart and means for taking up the exposed film by moving the carriers together for automatically releasing the feeding roll when the carriers are moved apart.

22. In a roll holder for photographic cameras, the combination with a casing or container, of a feeding carrier for a charged roll of film and a receiving carrier for the exposed roll, both arranged within the casing, means for moving the receiving carrier relatively to the casing away from the feed carrier, means for holding the receiving roll against rotation during such movement and means for automatically rotating the receiving roll during a reverse movement of the carrier toward the feed roll carrier.

23. In a roll holder for photographic cameras, the combination with a casing or container, of a feeding carrier for a charged roll of film, a receiving carrier for the exposed roll, means for moving one carrier relatively to the casing and away from the other to stretch a portion of the film for exposure and a rack bar and pinion on the receiving carrier and casing, respectively for automatically rotating the receiving roll to wind the stretch of film thereon during a reverse movement of said carrier toward the other.

24. In a roll holder, the combination with a feeding carrier for a charged roll of film and a receiving carrier for the exposed roll, of means for moving both carriers together in the same direction, means for holding one carrier at a predetermined point and means for continuing the movement of the other relatively to and independently of the first.

25. The combination with a camera comprising a casing and a lens front, of a feeding carrier for a charged roll of film and a receiving carrier for the exposed roll both arranged within the casing and movable relatively thereto and to each other, the camera front being movable to a folded position within the casing in the plane of movement of one of the carriers.

26. The combination with a camera comprising a casing and a lens front, of a feeding carrier for a charged roll of film and a receiving carrier for the exposed roll, both arranged within the casing, and means for moving one carrier toward and from the other to stretch successive areas of film in the focal plane of the camera, the camera front being movable to a folded position within the casing in the path of the movable carrier with the latter between it and the other carrier.

27. The combination with a camera, of a carrier for a charged roll of film and a second carrier for the exposed roll, both arranged within the camera casing and having inoperative positions adjacent each other at one side of the cone of light projected by the camera lens, of means for moving one carrier relatively to the other across the focal plane of the camera to stretch an area of film therein, and means for automatically projecting the other carrier to a position adjacent to the cone of light with the initial movement of the first.

28. The combination with a camera, of a carrier for a charged roll of film and a second carrier for the exposed roll, both arranged within the camera casing and having inoperative positions adjacent each other at one side of the cone of light projected by the camera lens, of means for moving one carrier relatively to the other across the focal plane of the camera to stretch an area of film therein, means for automatically projecting the other carrier to a position adjacent to the cone of light with the initial movement of the first and a light shield on one of the carriers arranged to protect the margin of the stretched film area in the region of the film roll.

29. In a roll holder for photographic cameras, the combination with a casing, of a feeding carrier for a charged roll of film and a receiving carrier for the exposed film, one of said carriers being adjustable to different set positions relatively to the other and the latter being movable toward and from the first to stretch successive film areas of different magnitude in the focal plane of the camera, and an actuating member for operating the adjustable carrier, and on which the latter is movable to one of its set positions.

30. In a roll holder for photographic cameras, the combination with a casing, of a feeding carrier for a charged roll of film and a receiving carrier for the exposed film, one of said carriers being adjustable to different set positions relatively to the other and the latter being movable toward and from the first to stretch successive film areas of different magnitude in the focal plane of the camera, an actuating member for operating the adjustable carrier and on which the latter is movable to one of its set positions, means for locking the actuating member to the casing, and means for locking the adjustable carrier on its actuating member.

31. In a roll holder for photographic cameras, the combination with a casing, of a feeding carrier for a charged roll of film and a receiving carrier for the exposed film, one of said carriers being adjustable to different set positions relatively to the other and the latter being movable toward and from the first to stretch successive film areas of different magnitude in the focal plane of the camera, an actuating member for operating the adjustable carrier and on which the latter is movable to one of its set positions, means for locking the actuating member to the casing, and means for locking the adjustable carrier on its actuating member when moved thereon to the said set position, simultaneously with the release of the locking means between the actuating member and casing.

32. In a roll holder for photographic cameras, the combination with a feed carrier for a charged roll of film and a receiving carrier for the exposed roll, one of said carriers being movable toward and from the other, of means for locking the receiving roll during the movement of the movable carrier away from the other to stretch an area of film in the focal plane of the camera, mechanism for automatically rotating the receiving roll during a reverse movement to take up the exposed film and means operated by the initial reverse movement of the movable carrier for locking the feed roll against unwinding.

33. In a roll holder for photographic cameras, the combination with a feed carrier for a charged roll of film and a receiving carrier for the exposed roll, one of said carriers being movable toward and from the other, of means for locking the receiving roll during the movement of the movable carrier away from the other to stretch an area of film in the focal plane of the camera, mechanism for automatically rotating the receiving roll during a reverse movement to take up the exposed film and means operated by the initial reverse movement of the movable carrier through the medium of the feed roll rotating mechanism for locking the feed roll against unwinding.

34. In a roll holder for photographic cameras, the combination with a feed carrier for a charged roll of film and a receiving carrier for the exposed roll movable toward and from the feed carrier, of means for locking the receiving roll against rotation during its movement away from the charged roll, means for rotating the receiving roll during its reverse movement toward the feed roll comprising a rack bar having a limited movement and a toothed member on the receiving roll carrier meshing therewith and means for locking the feed roll during the reverse movement of the receiving roll operated by the limited movement of the rack bar under the influence of the toothed member on the receiving carrier during the initial part of its reverse movement.

In testimony that I claim the foregoing as my own, I have hereto affixed my signature in the presence of two witnesses.

WILLIAM A. PETERS.

Witnesses:
E. G. KERR,
T. H. WICKS.